(12) United States Patent
Helder

(10) Patent No.: US 10,303,591 B1
(45) Date of Patent: May 28, 2019

(54) WEB SERVICES COMPARISON TOOL

(71) Applicant: Twitter, Inc., San Francisco, CA (US)

(72) Inventor: David Helder, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/244,648

(22) Filed: Aug. 23, 2016

Related U.S. Application Data

(63) Continuation of application No. 14/209,317, filed on Mar. 13, 2014, now Pat. No. 9,424,172.

(60) Provisional application No. 61/798,042, filed on Mar. 15, 2013.

(51) Int. Cl.
*G06F 11/00* (2006.01)
*G06F 11/36* (2006.01)
*G06F 8/71* (2018.01)

(52) U.S. Cl.
CPC ............ *G06F 11/3692* (2013.01); *G06F 8/71* (2013.01); *G06F 11/3664* (2013.01)

(58) Field of Classification Search
CPC .................. G06F 11/3692; G06F 11/3668
See application file for complete search history.

(56) References Cited

U.S. PATENT DOCUMENTS

| | | | |
|---|---|---|---|
| 8,001,422 B1 | 8/2011 | Sun et al. | |
| 8,739,126 B2 * | 5/2014 | Glaser | G06F 11/3664 709/219 |
| 8,990,778 B1 | 3/2015 | Allocca et al. | |
| 9,268,663 B1 * | 2/2016 | Siddiqui | G06F 11/3447 |
| 9,424,172 B1 | 8/2016 | Helder | |
| 2005/0041858 A1 * | 2/2005 | Celi, Jr. | G06F 17/30905 382/173 |
| 2009/0164621 A1 * | 6/2009 | Kothari | H04L 43/00 709/224 |
| 2012/0023371 A1 * | 1/2012 | Laengert | G06F 11/36 714/32 |
| 2013/0174126 A1 | 7/2013 | Belihomji et al. | |
| 2013/0219368 A1 * | 8/2013 | Carteri | G06F 11/3688 717/126 |
| 2015/0193405 A1 | 7/2015 | Gensburg et al. | |

* cited by examiner

*Primary Examiner* — Philip Guyton
(74) *Attorney, Agent, or Firm* — Fish & Richardson P.C.

(57) ABSTRACT

A method for testing web services includes obtaining, by a new version of a service deployed on a network framework, a request and an old response to the request generated by an old version of the service, generating, by the new version of the service, a new response to the request, and generating, by a comparison tool built into the network framework and accessible to the new version of the service, a comparison of the old response and the new response.

18 Claims, 5 Drawing Sheets

WEB SERVICES COMPARISON TOOL

CROSS-REFERENCE TO RELATED APPLICATIONS

Pursuant to 35 U.S.C. § 119(e), this application claims benefit of U.S. Provisional Application No. 61/798,042 filed on Mar. 15, 2013, entitled "WEB SERVICE COMPARISON TOOL." The disclosure of the U.S. Provisional Application is incorporated herein by reference in its entirety.

BACKGROUND

The Internet is constantly evolving, and developing software for the web is a continuous process—even when a service has been deployed to the web and is available for use by clients, continuing development and refinement is occurring. This development may result in new products, versions, features, services, a more efficient process, a redistribution of workload(s), and/or many other things. Testing and debugging a new version of a service is challenging, and error prone.

SUMMARY

In general, in one or more aspects, the invention relates to a method for testing web services. The method comprises: obtaining, by a new version of a service deployed on a network framework, a request and an old response to the request generated by an old version of the service, wherein the request originated from a client; generating, by the new version of the service, a new response to the request; and generating, by a comparison tool built into the network framework and accessible to the new version of the service, a comparison of the old response and the new response.

In general, in one or more aspects, the invention relates to a system for testing web services. The system comprises a network framework; a new version of a service deployed on the network framework and configured to: obtain a request and an old response to the request generated by an old version of the service, wherein the request originated from a client; and generate a new response to the request; and a comparison tool built into the network framework, accessible to the new version of the service, and configured to: generate a comparison of the old response and the new response.

In general, in one or more aspects, the invention relates to a method for testing web services. The method comprises: obtaining, by a network framework, a request for a first service deployed on the network framework, wherein the request is from a client and comprises a plurality of client data; receiving, from the first service, a first output based on the request, wherein the first output is in a first format; extracting a subset of the client data to generate a new request; routing, by the network framework, the new request to a second service; receiving, from the second service, a second output based on the new request, wherein the second output is in a second format; translating the second output to the first format; generating, after translating, a comparison of the first output and the second output, wherein the comparison identifies a difference; and sending an alert based on the difference.

DETAILED DESCRIPTION

Figure 1:
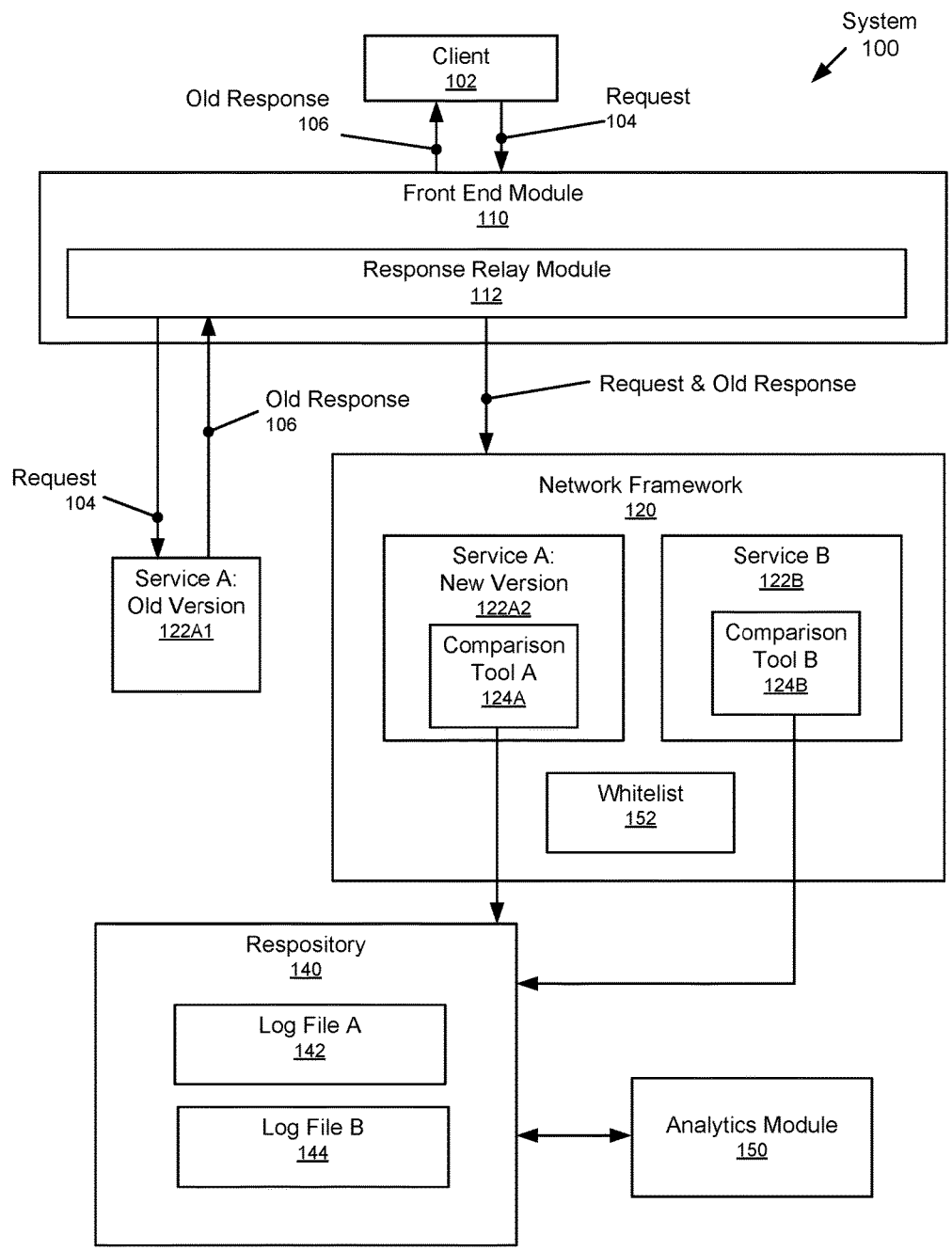
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention include a system and method for testing a new version of a service deployed on a network framework. Specifically, an old version of the service and the new version of the service are sent the same request, although the request may optionally be modified. The request is a "live" request from a client of the service/network framework. Both the old version of the service and the new version of the service generate a response to the request. The response of the old service to the request (i.e., old response) is sent to the client. The old response and the response of the new service to the request (i.e., new response) are compared by a comparison tool built into the network framework to identify any differences/discrepancies between a result data set in the old response and a result data set in the new response. The differences/discrepancies may only be reported, tracked, and/or counted if they exceed user customizable thresholds and/or tolerances. Graphs may be generated to visualize the differences and/or discrepancies and the differences and discrepancies may be sorted according to request type. Other actions may also be taken based on the differences and/or discrepancies including sending alerts, halting the new service, or any other suitable action.

FIG. 1 shows a system (100) in accordance with one or more embodiments of the invention. As shown in FIG. 1, the system (100) has multiple components including a front end module (110), a network framework (120), a repository (140), and an analytics module (150). Each of the components in system (100) may correspond to a desktop computer, a server, a tablet computer, a smart phone, a kiosk, etc. and may be connected by a network of any type and of any size having wired and/or wireless segments. The system (100) may correspond to a social network, a messaging platform, a testing platform, and/or any other suitable web service.

In one or more embodiments of the invention, the system (100) includes Service A: Old Version (122A1). Service A: Old Version (122A1) may be a web service. Service A: Old Version (122A1) receives a request (104) as input and generates an old response (106). Request (104) is received from client (102). The content in the request (104) and/or the old response (106) may have any format including, for example, HTML, XML, Scala, and/or JSON. Moreover, the content of the request (104) and/or the old response (106) may include date, time, HTTP method, path, status codes, user ID, client application ID, the client's country, language, user agent, IP address, GPS coordinates, etc. The old response (106) may include a result data set that is structured (i.e., the result data set has fields suitable for parsing) and/or data that is unstructured (i.e., bitmap image). The result data set may include strings, color values, GPS coordinates, financial values, Boolean values, hyperlinks, etc. The result data set forms at least part of the old response (106) to the request (104).

In one or more embodiments of the invention, the system (100) includes network framework (120). Network framework (120) corresponds to a defined support structure in which other software applications can be organized and developed. A framework may include support programs, tools, code libraries, a scripting language, common services, interfaces, or other software packages/utilities to help develop and glue together the different components of a software application. A network framework (120) is a reusable design and is a building block of a software systems and/or subsystems. In one or more embodiments, network framework (120) may be a web framework. It will be apparent to one of ordinary skill in the art that there are many different implementations and functionalities of network frameworks and, as such, the invention should not be limited to any specific implementation or functionality of a network or web framework.

In one or more embodiments of the invention, Service A: New Version (122A2) and Service B (122B) are both deployed on the network framework (120). Accordingly, both services (122A2, 122B) have access to all the features, functionality, code libraries, interfaces, and other resources of the network framework (120). Although in FIG. 1, Service A: Old Version (122A1) is shown as not being deployed on the network framework (120), in one or more embodiments of the invention, Service A: Old Version (122A1) is also deployed on the network framework (120).

In one or more embodiments of the invention, the system (100) includes Service A: New Version (122A2). Those skilled in the art, having the benefit of this detailed description, will appreciate that Service A: New Version (122A2) and Service A: Old Version (122A1) are different versions (i.e., an older version and a newer version, such as Version 1.0 and 1.1) of the same service. Accordingly, Service A: New Version (122A2) may have the same features/functionality as Service A: Old Version (122A1). Alternatively, Service A: New Version (122A2) may have more features/functionality than Service A: Old Version (122A1). As yet another alternative, Service A: New Version (122A2) may have fewer features and/or less functionality than Service A: Old Version (122A1). In one or more embodiments of the invention, the two versions (122A1, 122A2) differ in how they are implemented/deployed. In one or more embodiments of the invention, service B (122B) is a different service than and/or unrelated to Service A: Old Version (122A1) and Service A: New Version (122A2). For example, service B (122B) may be an entirely new service with different functionality and a different purpose than Service A: Old Version (122A1) and Service A: New Version (122A2).

In one or more embodiments of the invention, Service A: New Version (122A2) inputs both the request (104), or some modification thereof, and the old response (106), and generates a new response (not shown) to the request (104). Like the old response (106), the new response may include a result data set that is structured (i.e., the result data set has fields suitable for parsing) and/or data that is unstructured (i.e., bitmap image). The result data set may include strings, color values, GPS coordinates, financial values, Boolean values, hyperlinks, etc. Alternatively, Service A: New Version (122A2) may input only the request (104), or some modification thereof. Likewise, Service B (122B) may input both the request (104), or some modification thereof, and the old response (106), and generates a new response (not shown) to the request (104). Alternatively, Service B (122B) may input only the request (104), or some modification thereof. In one or more embodiments of the invention, the new response (not shown) is never sent to, or seen by, client (102).

In one or more embodiments of the invention, the system (100) includes a front end module (110). The front end module (110) is an interface between the client (102) and the one or more services (122A1, 124A2, 122B). The front end module (110) may be a web server. The client (102) may be a smart phone, a desktop computer, a tablet computer, or any type of device. The front end module (110) routes the request (104) from the client (102) to the service capable of responding to the request (104). In FIG. 1, the front end module (110) routes the request (104) from the client (102) to Service A: Old Version (122A1). Moreover, the front end module (110) returns the old response (106) generated by Service A: Old Version (122A1) to the client (102).

In one or more embodiments of the invention, the front end module (110) includes a response relay module (112). The response relay module (112) relays the request (104) and the old response (106) to Service A: New Version (122A2) and/or Service B (122B). In one or more embodiments of the invention, the response relay module (112) is built on the network framework (120). In one or more embodiments of the invention, the response relay module (112) is not built on the network framework (120), but includes functionality to communicate with the network framework (120). Further, response relay module (122) may only relays the request to Service A: New Version (122A2) and/or Service B (122B), and may send the old response (106) directly to the repository (140), for example, or to any other suitable location or service. In one or more embodiments of the invention, response relay module (112) includes functionality to modify the request (104) and/or old response (106) before relaying request (104) and old response (106) to Service A: New Version (122A2) and/or Service B (122B). Any of the data (e.g., identification number, GPS location, text, etc) or formatting (e.g., spacing, HTML, tags, etc) of request (104) and/or old response (106) may be modified. The modification may be performed in any manner now known or later developed.

Although FIG. 1 shows the response relay module (112) relaying the old response (106) and the request (104) to Service A: New Version (122A2), in one or more embodiments of the invention, Service A: Old Version (122A1) sends the old response (106) and/or the request (104) directly to Service A: New Version (122A2) (i.e., the response relay module (112) is not involved and might not even be present). This might occur in embodiments where Service A: Old Version (122A1) is also deployed on the network framework (120) and thus has access to comparison tool A (124A) and/or comparison tool B (124B).

As discussed above, the network framework (120) may include support programs, tools, code libraries, a scripting language, common services, interfaces, or other software packages/utilities to help develop and glue together the different components of a software application. In one or more embodiments of the invention, a comparison tool is built into the network framework (120). A service deployed on the network framework (120) has access to the functionality of the comparison tool and/or has an instantiation of the comparison tool. As shown in FIG. 1, Service A: New Version (122A2) has comparison tool A (124A) and Service B (122B) has comparison tool B (124B). Comparison tool A (124A) and comparison tool B (124B) are different instantiations (i.e., in different services deployed on the network framework (120)) of the same comparison tool built into the network framework (120). Any and every subsequent service deployed on the network framework (120) (not shown) may utilize an instantiation of the comparison tool. In one or more embodiments of the invention, comparison tool A (124A) and/or comparison tool B (124B) may be deployed independent of their respective services. In other words, comparison tool A (124A) and/or comparison tool B (124B) may be located directly within network framework (120), or external to network framework (120), such as in analytics module (150), rather than the configuration depicted in FIG. 1. It will be apparent to one of ordinary skill in the art that the comparison tools may be deployed in any suitable location and, as such, the invention should not be limited to the configuration(s) described above and/or depicted in FIG. 1.

In one or more embodiments of the invention, comparison tool A (124A) is configured to generate a comparison of the old response (106) with the new response generated by Service A: New Version (122A2). Specifically, comparison tool A (124A) is configured to generate a comparison of the result data set in the old response (106) with the result data set in the new response. The comparison may correspond to differences and/or discrepancies between the two result data sets. Likewise, comparison tool B (124B) is configured to generate a comparison of the old response (106) with the new response generated by Service B (122B). In one or more embodiments of the invention, comparison tool A (124A) and comparison tool B (124B) may simply determine whether the execution of the request (104) was successful by their respective services.

In the case of unstructured data (discussed above), the bitmap image of one result data set is compared against the bitmap image of the other result data set. In the case of structured data (discussed above), the comparison may take place on a field-by-field basis. In other words, the data value in a field of one result data set may be compared with the data value in the corresponding field of the other result data set. In one or more embodiments of the invention, the comparison may identify which result data set has additional fields or fewer fields than expected.

In one or more embodiments of the invention, comparison tool A (124A) and/or comparison tool B (124B) take into consideration tolerances and/or thresholds when comparing the result data sets. If a difference or discrepancy between two result data sets (or specific fields) falls within the tolerance or within the threshold, the comparison tool A (124A) and/or comparison tool B (124B) may ignore the actual difference or discrepancy and report the two result data sets (or fields) as being the same. In one or more embodiments of the invention, the tolerances and/or threshold(s) may be identified in whitelist (152) or a blacklist (not shown). A whitelist identifies what differences or discrepancies are acceptable, and/or what fields should not be compared. A blacklist is the reverse of a whitelist, and identifies what differences or discrepancies are not acceptable, and/or what fields should be compared.

In one or more embodiments of the invention, comparison tool A (124A) and/or comparison tool B (124B) may compare any field, item, data, or aspect of the result data sets. For example, the comparisons may involve: tokens, colors, footers, direct messages, GPS data, user names, user handles, status text, height, width, images, favorites, retweets, URLs, user stats, and/or any other data. Further, comparison tool A (124A) and/or comparison tool B (124B) may have a tolerance for any possible data. For example, when comparing strings of two different result data sets, differences arising from uppercase vs. lowercase letters may be tolerated (i.e., the comparison may be case insensitive). As another example, if the result data sets report names, differences arising from middle names vs. middle initials vs. no middle name may be tolerated. As another example, if the result data set reports GPS coordinates, the comparison tool A (124A) may tolerate (i.e., ignore) differences arising between GPS coordinates that are within a predefined distance (e.g., 500 feet) of each other.

In one or more embodiments of the invention, operation of the comparison tool A (124A) and comparison tool B (124B) is controlled by one or more configuration files. The configuration file(s) may be set by Service A: New Version (122A2) and/or Service B (122B) during its execution and/or set by the developer, programmer, buyer, and/or end-user of Service A: New Version (122A2) and/or Service B (122B). In one or more embodiments of the invention, the comparison tool A (124A) and/or comparison tool B (122B) include one or more counters to track: (i) perfect matches between two result data sets; (ii) comparisons where the only difference(s) between two result data sets falls within a tolerance; and/or (iii) comparisons where N or more differences between two result data sets exceed the tolerance(s). In one or more embodiments of the invention, the comparison, the result data sets involved in the comparison, and/or the request (104) that triggered the old response (106) and the new response are stored in the repository (140). The counters in comparison tool A (124A) may be queried and the retrieved counts stored in the repository (140). Specifically, the counts, the comparison, the result data sets involved in the comparison, and/or the request (104) that triggered the old response (106) and the new response may be stored as one or more log files (i.e., Log File A (142), Log File B (144)) in the repository (140).

In one or more embodiments of the invention, the system (100) includes an analytic module (150). The analytic module (150) is configured to aggregate the data from the files (142, 144) in the repository (140), and subsequently generate reports, graphs, and/or alerts. The reports and graphs may be used to identify the types of clients and/or the types of requests that trigger result data sets with the most, the least, or some range of differences/discrepancies. The alerts may be sent when a certain number of errors are detected, or a certain percentage of results include an error(s). The alert may be sent to any suitable entity, such as the programmer or team who designed the new service. These statistics may be used to debug Service A: New Version (122A2) so that Service A: New Version (122A2) may one day replace Service A: Old Version (122A1) or Service A: New Version (122A2) may remove some computational burden from Service A: Old Version (122A1) by sharing responsibility for responding to the load of incoming requests (e.g., from multiple clients).

Figure 2:
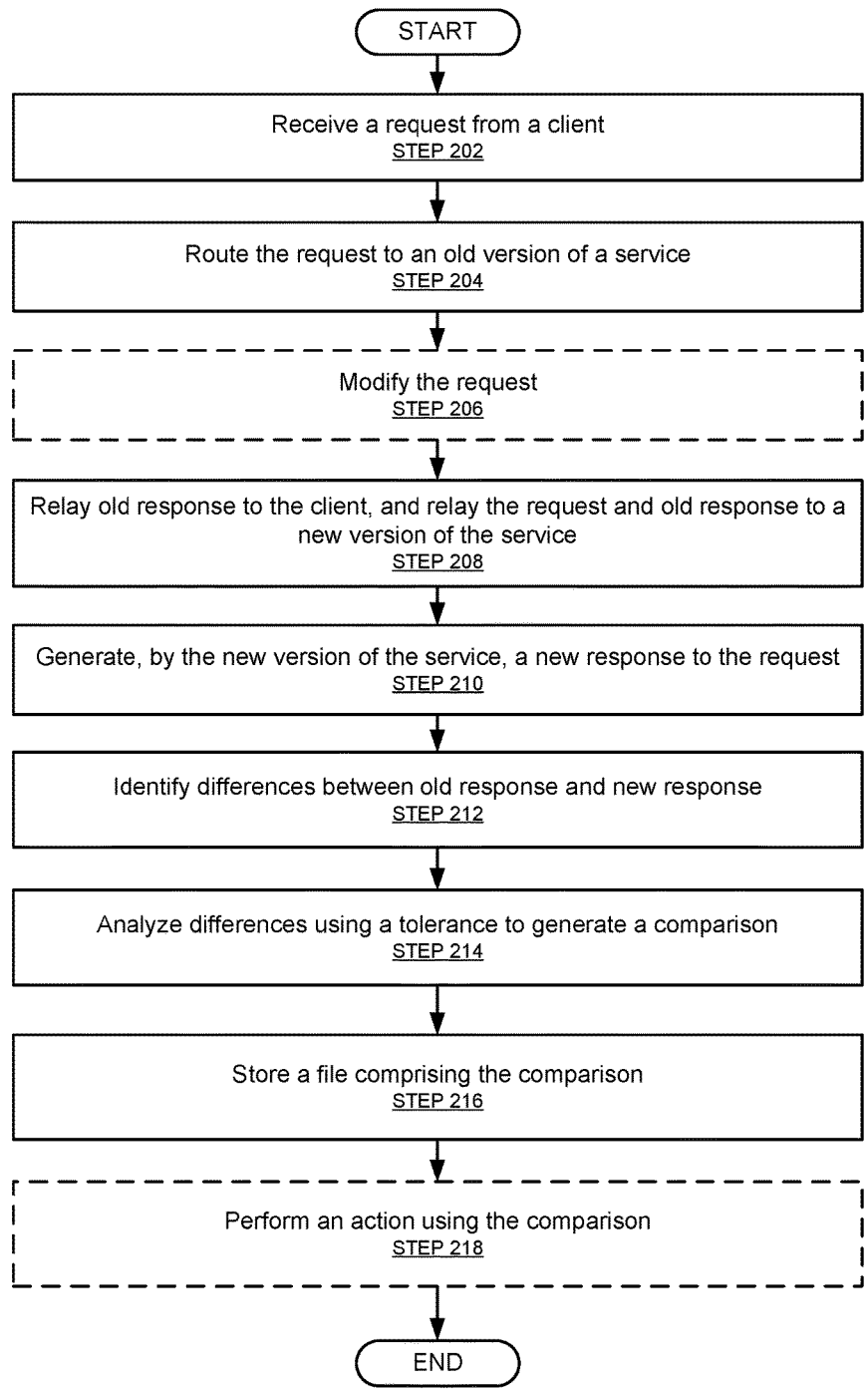
FIG. 2 shows a flowchart in accordance with one or more embodiments of the invention.

FIG. 2 shows a flowchart in accordance with one or more embodiments of the invention. The process shown in FIG. 2 may correspond to the operation of a testing system and/or a messaging platform. Moreover, the process shown in FIG. 2 may utilize one or more of the components (e.g., 112, 122A1, 122A2, 122B, 124A, 124B, 120, 150, etc) of system (100), discussed above in reference to FIG. 1. The sequence of steps shown in FIG. 2 may differ among embodiments of the invention, and one or more of the steps may be performed in parallel, and/or may be optional. Moreover, one or more steps in FIG. 2 may be repeated. Accordingly, the scope of the invention should not be considered limited to the specific arrangement of steps shown in FIG. 2.

In STEP 202, a request is received from a client. The client may issue/broadcast the request using a smartphone, a tablet computer, a desktop computer, or any type of hardware device. The request may be of any type and in any format.

In STEP 204, the request is routed to the old version of a service capable of responding to the request. The request may be routed by a front end module that operates as an interface between the client and the service.

In STEP 206, the request is modified. STEP 206 is optional, as indicated by the dotted lines. The request may be modified in any manner now known or later developed. In particular, the request may be modified to a new format or content that is used by the new version of the service. The modification may include removing elements, adding elements, reordering elements, or any other suitable modification. For example, if a new service is being tested, then only a small portion of the request may be sent on to the new service. As another example, if a new version of a service is being deployed using a new programming language, the request may be modified to fit the requirements of the new programming language. It will be apparent to one of ordinary skill in the art that there are many potential modifications that may be made and, as such, the invention should not be limited to the above examples.

In STEP 208, the old response is relayed to the client, and the request and old response are relayed to a new version of the service. The old response may be relayed to the client in any manner now known or later developed. Likewise, the request and old response may be relayed to the new version of the service in any manner now known or later developed. Optionally, the request may have been modified prior to being relayed to the new version of the service. Further, in one more embodiments, only the request is replayed to the new version of the service, and the old response may be sent directly to storage, or any other suitable location.

In STEP 210, the new version of the service generates a new response to the request. The new response includes a result data set with structured and/or unstructured data. The result data set may include strings, financial values, GPS coordinates, color values, Boolean values, and/or any other element.

In STEP 212, differences between the old response and the new response are identified. The differences may be identified by a comparison tool built into the network framework. Specifically, the result data sets of the old response and the new response are compared to identify differences and/or discrepancies between the result data sets. The differences and/or discrepancies may be between any element/field/etc of the result data sets and may be performed in any manner now known or later developed. In the event that no comparison is performed in STEP 214, STEP 212 may be skipped.

In STEP 214, the differences are analyzed using a tolerance/threshold to generate a comparison. The tolerances and/or thresholds may be identified in a whitelist, blacklist, or any other suitable form. A difference that falls within the tolerance may be ignored. Counters within the comparison tool may be used to track statistics associated with the comparisons. The tolerances may be set using a configuration file(s) (such as a whitelist or blacklist) that controls operation of the comparison tool. Optionally, STEP 214 may be skipped. In other words, no comparison may be performed.

In STEP 216, one or more files logging the comparisons, the old/new responses, the request, the counted values, and/or any other suitable element(s) may be stored in a repository. The files may be stored in any manner now known or later developed.

In STEP 218, an action is performed using the comparison(s) and/or file(s). The action may be based on an aggregation of many comparisons, such as sending an alert to a programmer when a set number of errors is reached, or when a given error is occurring a certain percentage of the time. Alternatively, one or more graphs and/or reports are generated from comparisons, the requests, the counted values, the old/new responses, etc. The reports and graphs may be used to identify the types of clients and/or the types of request that trigger results data sets with the most, the least, or some range of differences/discrepancies. The statistics associated with the graphs/reports may be used to debug the new version of the service so that it may one day replace the old version service and/or remove some computation burden from the old version of the service by responding to some of the incoming requests. In one or more embodiments, the action may be based on components of the file(s) other than a comparison, such as the new response, old response, request, or any other suitable element.

The following section describes various examples of the invention. The examples are included to aid in the understanding of the invention and are not intended to limit the scope of the invention.

Figure 3:
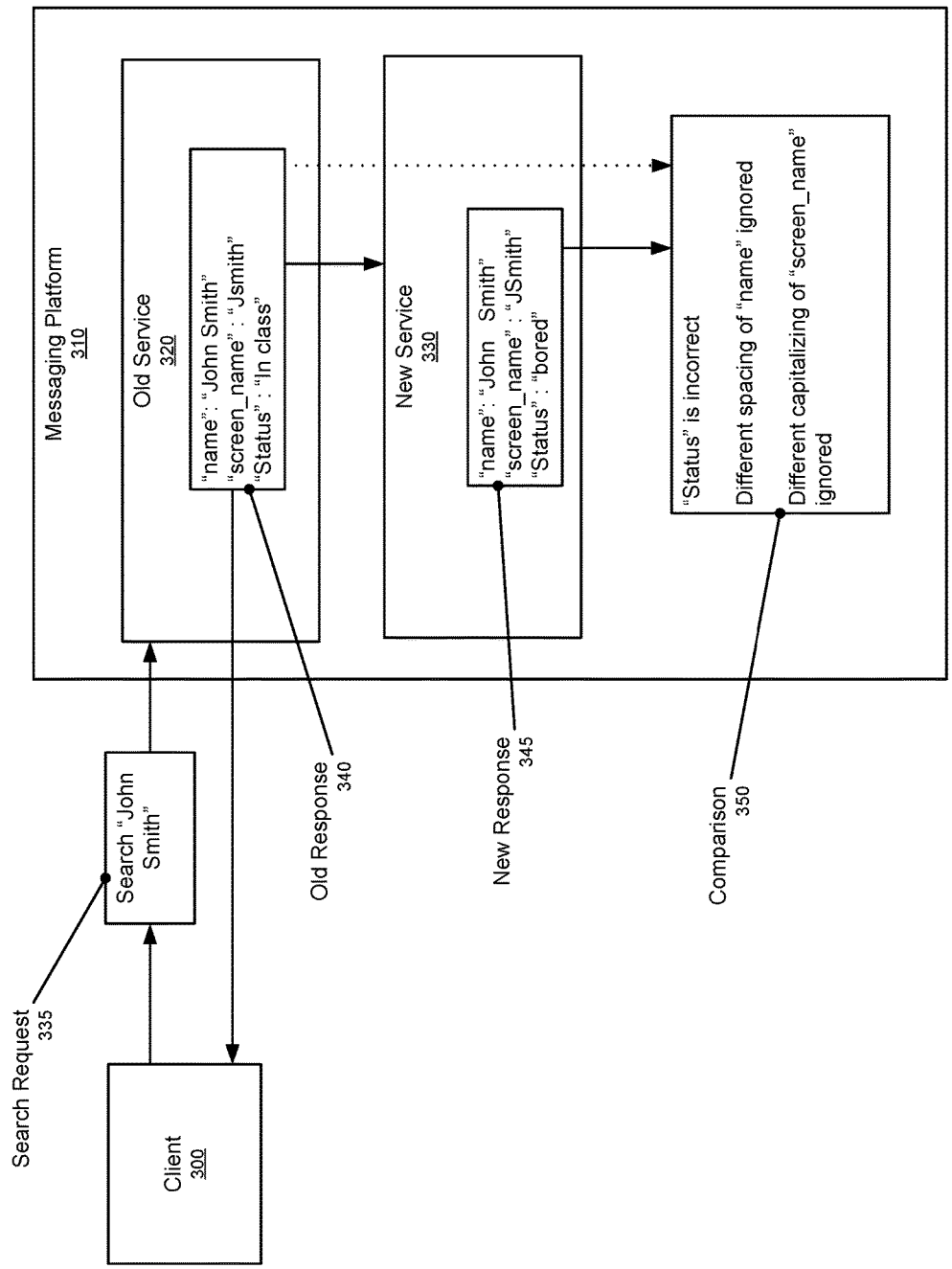
FIGS. 3 and 4 show examples in accordance with one or more embodiments of the invention.

FIG. 3 shows client (300) requesting that messaging platform (310) perform a search. Initially, client (300) sends a message to messaging platform (310) requesting that a search of "John Smith" (search request (335)) be performed. Upon receipt of the request, old service (320) of messaging platform (310) performs the search, generating the old response (340) of: "name": "John Smith" "screen_name": "Jsmith" "Status": "In class." After old response (340) is generated, old response (340) is sent to client (300).

However, old response (340) is also sent to new service (330), along with the original request (search request (335)). Optionally, search request (335) may be modified before being sent to new service (330). Whether or not search request (335) was modified, new service (330) performs the search, resulting in the new response (345) of: "name": "John Smith" "screen_name": "JSmith" "Status": "bored." New response (345) is not sent to client (300). Rather, new response and old response (340) are compared (not shown) to generate comparison (350) which specifies that: "Status" is incorrect, different spacing of "name" ignored, different capitalizing of "screen_name" ignored." All differences between old response (340) and new response (345) are identified in comparison (350) but some are ignored in this example due to a tolerance or threshold for errors, which is identified in a whitelist (not shown).

Figure 4:
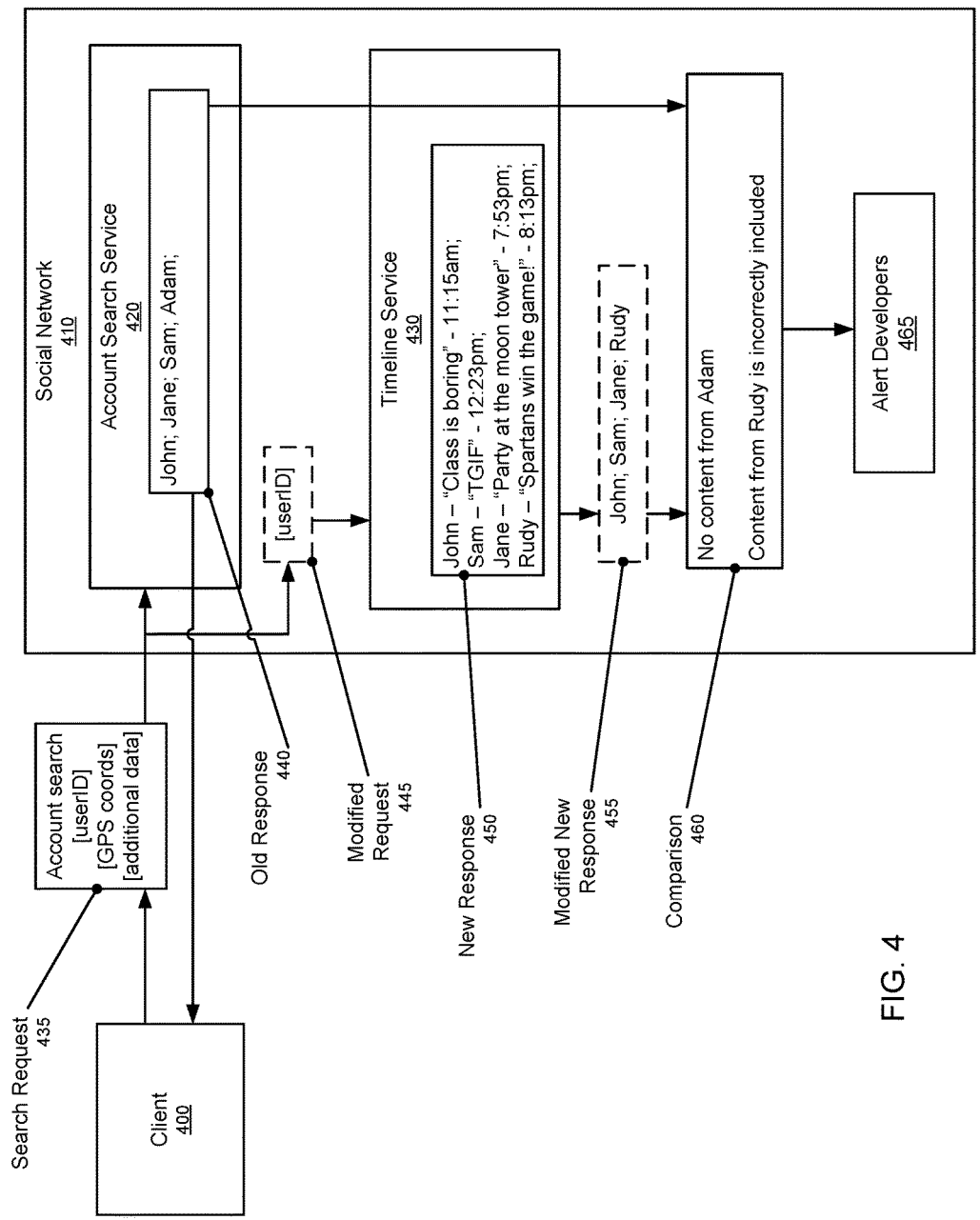

FIG. 4 shows a second example. Specifically, in FIG. 4, client (400) is sending search request (435) to social network (410). Search request (435) is a request for an "account search" and includes data such as the userID, current GPS coordinates, and other data related to client (400). The search request is routed to the account search service (420) of social network (410). Account search service (420) is a service that returns the accounts that a given userID follows, in HTML format. For client (400), account search service (420) returns the old response (440) of "John; Jane; Sam; Adam," which is then returned to the client (400).

Meanwhile, the search request (435) is also routed to timeline service (430). However, timeline service (430) requires only a userID, thus the request is modified before being sent to the timeline service (430), resulting in modified request (445), which contains only "[userID]". The modified request (445) is routed to timeline service (430). Timeline service (430) is a new service being tested by social network (410), and timeline service (430) is supposed to return content, such as messages, authored by accounts followed by a given user and the time when the content was created, in JSON format. Thus, timeline service (430) generates new response (450) identifying John posting "class is boring" at 11:15 am, Sam posting "TGIF" at 12:23 pm, Jane posting "party at the moon tower" at 7:53 pm, and Rudy posting "Spartans win the game!" at 8:13 pm.

As an initial test of their new service, the developers at social network (410) want to check to ensure that the content returned by timeline service (430) is authored only by people who client (400) follows. To perform the test, the outputs of both services will need to either be modified to a common format, or one output will need to be modified to the format of the other. Additionally, since the developers are currently only checking that the content returned by timeline service (430) is authored only by people who client (400) follows, all additional data generated by timeline service (430) should be discarded. Thus, new response (450) is modified to generate modified new response (455), which contains only the names of accounts that appear in new response (450)—John, Sam, Jane, and Rudy, and is in an HTML format for easy comparison with old response (440). Then, comparison (460) may be performed using old response (440) and modified new response (455). Comparison (460) identifies that no content from Adam is returned, and that content from Rudy is included when it should not have been. Thus, the developers are alerted (465) and may work to correct the errors.

It will be apparent to one of ordinary skill in the art, having the benefit of this detailed description, that the invention enables a developer, programmer, or other suitable entity to access a large amount of "live" data from clients for the purposes of testing new versions, new components, or other new web services, all while not impacting the client experience. The client does not even know that a new version/service/etc is being tested. This allows for not only easier testing and debugging, but also more thorough testing, due to the potential volume of unique requests. This thorough testing may enable the releases of new versions/services/etc to be substantially easier. It will be apparent to one of ordinary skill in the art that other advantages are also conferred by the invention and, as such, the invention should not be limited to the above advantages.

Figure 5:
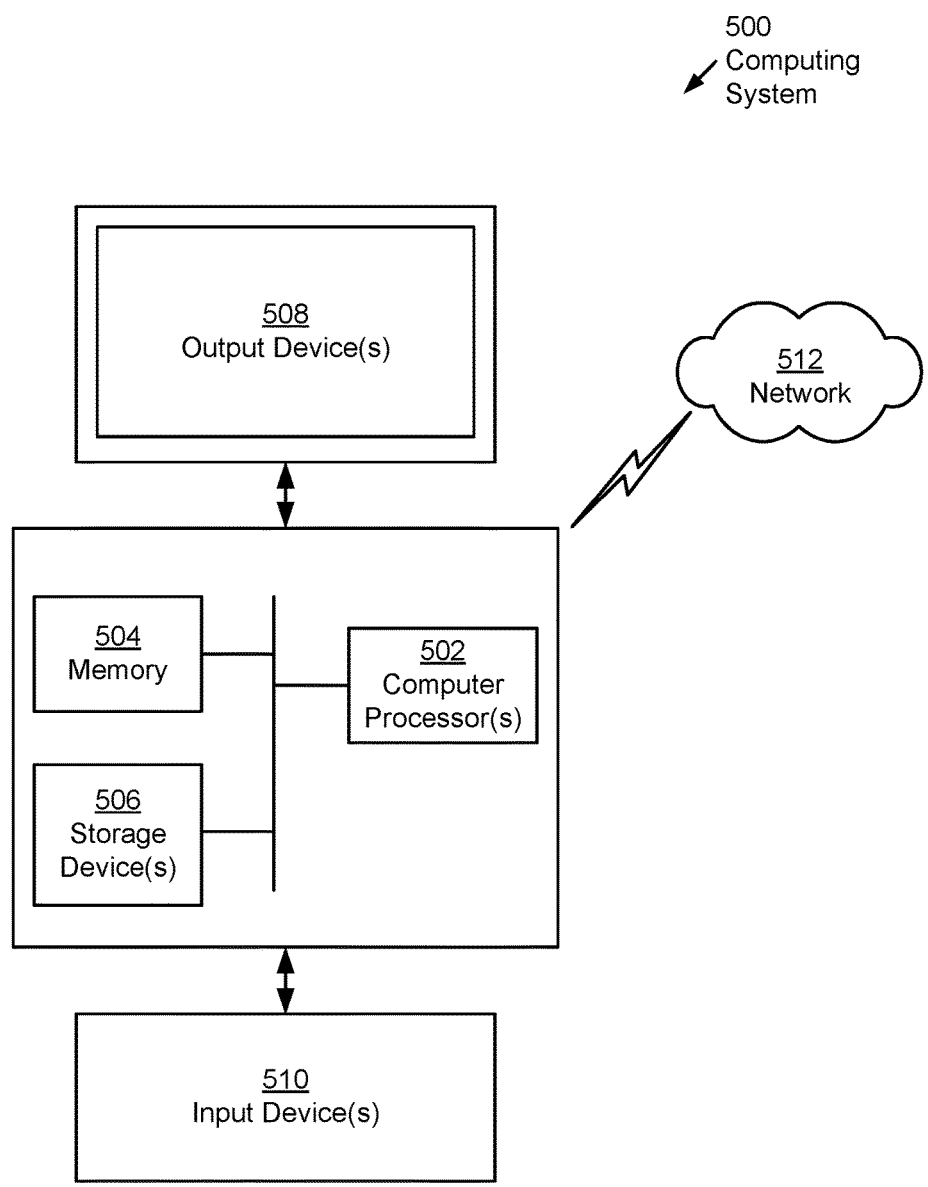
FIG. 5 shows a computer system in accordance with one or embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    receiving a request from a client device, wherein the request is associated with account information of a messaging platform;
    sending the request to a current service and to a test service deployed on a network framework;
    receiving a first response that includes a first results data set to the request from the current service, wherein the first response identifies one or more accounts of the messaging platform;
    receiving a second response that includes a second results data set to the request from the test service, wherein the second response identifies messages associated with accounts of the messaging platform;
modifying one or more of the first response or the second response so that both responses are in a common format;
comparing the first response and the second response to identify differences between the first results data set and the second results data set;
for each difference,
  determining whether the difference between the first and the second results data sets exceeds a user customizable threshold; and
  in response to determining that the difference between the first and the second results data sets exceeds the user customizable threshold, reporting the difference; and
sending the first response including the first results data set to the client device as a response to the request.

2. The method of claim 1, wherein modifying the second response includes modifying a format of the second response to match a format of the first response.

3. The method of claim 1, further comprising:
in response to determining that the difference between the first and second results data sets does not exceed the user customizable threshold, ignoring and not reporting the difference.

4. The method of claim 3, further comprising:
aggregating the differences between the first and the second results data sets that exceed the user customizable threshold; and
sending an alert in response to the aggregated differences exceeding an error threshold.

5. The method of claim 1, wherein the comparing comprises comparing a bitmap image of unstructured data of the first results data set to a bitmap image of unstructured data of the second results data set.

6. The method of claim 1, wherein the comparing comprises comparing particular values of particular data fields in the first results data set to particular values of particular data fields in the second results data set.

7. A system for testing web services, comprising:
a network framework comprising one or more computer devices including one or more processors and one or more storage devices;
a current version of a service deployed on the network framework and configured to:
  receive a request from a client device, wherein the request is associated with account information of a messaging platform, and
  receive a first response to the request, wherein the first response includes a first results data set, and wherein the first response identifies one or more accounts of the messaging platform;
a test version of the service deployed on the network framework and configured to:
  receive the request; and
  receive a second response to the request, wherein the second response includes a second results data set, and wherein the second response identifies messages associated with accounts of the messaging platform; and
a comparison tool built into the network framework, accessible to the test version of the service, and configured to:
  modify one or more of the first response or the second response so that both responses are in a common format,
  compare the first response and the second response to identify differences between the first results data set and the second results data set,
  for each difference,
    determine whether the difference between the first and the second results data sets exceeds a user customizable threshold; and
    in response to determining that the difference between the first and the second results data sets exceeds the user customizable threshold, report the difference.

8. The system of claim 7, wherein modifying the second response includes modifying a format of the second response to match a format of the first response.

9. The system of claim 7, wherein the comparison tool is further configured to:
in response to determining that the difference between the first and the second results data sets does not exceed the user customizable threshold, ignore and not report the difference.

10. The system of claim 9, further configured to:
aggregate the differences between the first and second results data sets that exceed the user customizable threshold; and
send, an alert in response to the aggregated differences exceeding an error threshold.

11. The system of claim 7, wherein the comparison tool is configured to compare a bitmap image of the first results data set to a bitmap image of the second results data set.

12. The system of claim 7, wherein the comparison tool is configured to compare particular values of particular data fields in the first results data set to particular values of particular data fields in the second results data set.

13. One or more non-transitory computer-readable storage media encoded with instructions that, when executed by one or more computers, cause the one or more computers to perform operations comprising:
receiving a request from a client device, wherein the request is associated with account information of a messaging platform;
sending the request to a current service and to a test service deployed on a network framework;
receiving a first response that includes a first results data set to the request from the current service, wherein the first response identifies one or more accounts of the messaging platform;
receiving a second response that includes a second results data set to the request from the test service, wherein the second response identifies message associated with accounts of the messaging platform;
modifying one or more of the first response or the second response so that both responses are in a common format;
comparing the first response and the second response to identify differences between the first results data set and the second results data set;
for each difference:
  determining whether the difference between the first and the second results data sets exceeds a user customizable threshold; and
  in response to determining that the difference between the first and the second results data sets exceeds the user customizable threshold, reporting the difference, and
sending the first response including the first results data set to the client device as a response to the request.

14. The one or more non-transitory computer-readable storage media of claim 13, wherein modifying the second response includes modifying a format of the second response to match a format of the first response.

15. The one or more non-transitory computer-readable storage media of claim 13, wherein the operations further comprise:
   in response to determining that the difference between the first and the second results data sets does not exceed the user customizable threshold, ignoring and not reporting the difference if the difference.

16. The one or more non-transitory computer-readable storage media of claim 13, the operations further comprising:
   aggregating the differences between the first and the second results data sets that exceed the user customizable threshold; and
   sending an alert in response to the aggregated differences exceeding an error threshold.

17. The one or more non-transitory computer-readable storage media of claim 13, wherein the comparing comprises comparing a bitmap image of unstructured data of the first results data set to a bitmap image of unstructured data of the second results data set.

18. The one or more non-transitory computer-readable storage media of claim 13, wherein the comparing comprises comparing particular values of particular data fields in the first results data set to particular values of particular data fields in the second results data set.

* * * * *